United States Patent
Oh et al.

(10) Patent No.: US 9,919,633 B2
(45) Date of Patent: Mar. 20, 2018

(54) COOLING AND HEATING CUP HOLDER

(71) Applicant: Hyundai Motor Company, Seoul (KR)

(72) Inventors: Man Ju Oh, Yongin-si (KR); Jae Woong Kim, Hwaseong-si (KR); Jae Woo Park, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/003,540

(22) Filed: Jan. 21, 2016

(65) Prior Publication Data

US 2016/0137114 A1    May 19, 2016

Related U.S. Application Data

(62) Division of application No. 13/737,747, filed on Jan. 9, 2013, now abandoned.

(30) Foreign Application Priority Data

Sep. 13, 2012 (KR) ........................ 10-2012-0101437

(51) Int. Cl.
| | |
|---|---|
| *F25B 21/02* | (2006.01) |
| *B60N 3/10* | (2006.01) |
| *F25B 21/04* | (2006.01) |

(52) U.S. Cl.
CPC .............. *B60N 3/104* (2013.01); *F25B 21/04* (2013.01); *F25D 2331/808* (2013.01); *F25D 2331/809* (2013.01)

(58) Field of Classification Search
CPC ... B60N 3/104; F25B 21/02; F25D 2331/805; F25D 2331/808; F25D 2331/809
See application file for complete search history.

(56) References Cited

U.S. PATENT DOCUMENTS

| | | | |
|---|---|---|---|
| 3,808,825 A * | 5/1974 | Ciurea .................... | F25B 21/02 |
| | | | 219/386 |
| 4,581,898 A | 4/1986 | Preis | |
| 5,720,171 A * | 2/1998 | Osterhoff ............ | A47J 36/2461 |
| | | | 62/298 |

(Continued)

FOREIGN PATENT DOCUMENTS

| | | |
|---|---|---|
| JP | 5-58469 U | 8/1993 |
| JP | 2000-514170 A | 10/2000 |

(Continued)

*Primary Examiner* — Elizabeth Martin
(74) *Attorney, Agent, or Firm* — Morgan, Lewis & Bockius LLP

(57) ABSTRACT

A cooling and heating cup holder includes a holder body having a container shape, formed of a thermally conductive material, having a substantially uniform thickness, and having a contact portion pressed from an inner side to integrally protrude outward from one side surface thereof and having a contact surface forming a predetermined plane; a Peltier element including an operation surface and a heat radiating portion having an opposite row opposite to the operation surface and installed such that the operation surface is directly attached to the contact surface at an outer side of the holder body to transfer heat to the contact surface; and an air conditioner including a heat radiating duct in which the heat radiating portion of the Peltier element is buried and a blowing fan for blowing out air at one side of the heat radiating duct.

2 Claims, 7 Drawing Sheets

(56) References Cited

U.S. PATENT DOCUMENTS

2007/0204629 A1* 9/2007 Lofy .................. B60N 3/104
  62/3.61
2008/0271462 A1 11/2008 Hoyle

FOREIGN PATENT DOCUMENTS

| KR | 2000-0000153 A | 1/2000 |
| KR | 20-0363562 Y1 | 10/2004 |
| KR | 10-2005-0057805 A | 6/2005 |
| WO | WO 97/47931 A1 | 12/1997 |

* cited by examiner

US 9,919,633 B2

COOLING AND HEATING CUP HOLDER

CROSS-REFERENCE TO RELATED APPLICATION

The present application is a Divisional of U.S. patent application Ser. No. 13/737,747, filed Jan. 9, 2013, which claims priority to Korean Patent Application No. 10-2012-0101437 filed Sep. 13, 2012, the entire contents of which applications are incorporated herein for all purposes by these references.

BACKGROUND OF INVENTION

Field of Invention

The present invention relates to a cooling and heating cup holder mounted to a vehicle and the like to receive a cup and cool and heat the cup.

Background Art

A cup holder is provided in a vehicle and the like. The cup holder generally includes a simple holding function, but a cup holder also having a cooling and heating function is being introduced according to a vehicle.

A representative patent document for such a cup holder is KR 10-2005-0057805 A, in which a heat transfer block is coupled to a case of the cup holder and a thermoelectric element is attached to the heat transfer block so that heat can be transferred to a container through the thermoelectric block.

However, in this construction, the thermoelectric block itself serves as a resistance, causing thermal conductivity to be low, which makes it difficult to actually show a cooling and heating effect sufficiently. Thus, a structure of a cup holder which can increase the cooling and heating efficiency is necessary.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for a cooling and heating cup holder designed to have a structure having high thermal conductivity.

In various aspects, the present invention provides a cooling and heating cup holder including: a holder body having a container shape, formed of a thermally conductive material, having a substantially uniform thickness, and having a contact portion pressed from an inner side to integrally protrude outward from one side surface thereof and having a contact surface forming a predetermined plane; a Peltier element including an operation surface and a heat radiating portion having an opposite row opposite to the operation surface and installed such that the operation surface is directly attached to the contact surface at an outer side of the holder body to transfer heat to the contact surface; and an air conditioner including a heat radiating duct in which the heat radiating portion of the Peltier element is buried and a blowing fan for blowing out air at one side of the heat radiating duct.

A pair of holder bodies and a pair of Peltier elements may be provided to face each other with respect to the heat radiating duct, and the pair of Peltier elements may be installed to share the heat radiating duct and the blowing fan.

The contract portions of the holder bodies may protrude to face each other, the Peltier elements may be provided to the contact portions, respectively, and the heat radiating portions of the Peltier elements may be buried to face the heat radiating duct such that heat is radiated by one blowing fan.

The holder body may be integrally formed through a hydrofoaming method such that the contact portion has a uniform thickness.

The contact portion may have a side surface portion bent at one side surface of the holder body to protrude and a contact surface formed on a plane to form an upper surface of the side surface portion.

The operation surface of the Peltier element and the contact surface of the holder body may make surface-contact with each other so that heat is directly transferred from the Peltier element to the holder body.

The cooling and heating cup holder may further include: an insulator provided to surround an outer surface of the holder body by a predetermined thickness.

The insulator may surround the holder body except for the contact portion.

The heat radiating portion of the Peltier element may correspond to heat radiating fins attached to the heat radiating surface corresponding to an opposite surface to the operation surface, and the heat radiating duct may be installed to be close to the contact portion of the holder body such that the heat radiating portion is entirely buried in the heat radiating duct.

A pair of holder bodies and a pair of Peltier elements may be provided to face each other with respect to the heat radiating duct, the contract portions of the holder bodies may protrude to face each other, the Peltier elements may be provided to the contact portions, respectively, the heat radiating portions of the Peltier elements may be buried to face the heat radiating duct such that heat is radiated by one blowing fan, the heat radiating portions of the Peltier element may correspond to heat radiating fins attached to a heat radiating surface corresponding to an opposite surface of the operation surface, and the heat radiating duct may be installed close to the contact portions of the holder bodies such that the heat radiating portions are entirely buried in the heat radiating duct.

In other aspects, the present invention provides a cooling and heating cup holder including: a holder body having a container shape, formed of a thermally conductive material, having a substantially uniform thickness, and having a curved portion pressed from an outer side to be integrally curved inward from one side surface thereof and having an attaching surface forming a predetermined plane; a Peltier element including an operation surface and a heat radiating portion having an opposite row opposite to the operation surface and installed such that the operation surface is directly attached to the attaching surface at an outer side of the holder body to transfer heat to the contact surface; and an air conditioner including a heat radiating duct in which the heat radiating portion of the Peltier element is buried and a blowing fan for blowing out air at one side of the heat radiating duct.

A pair of holder bodies and a pair of Peltier elements may be provided to face each other with respect to the heat radiating duct, and the heat radiating duct may be installed to pass between the facing curved portions such that both the facing heat radiating portions are buried to face the heat radiating duct so as to share the heat radiating duct and the blowing fan.

Streamlined recessed portions may be formed at opposite points of opposite side surfaces of the heat radiating duct, a pair of holder bodies may be seated on the recessed portions to be attached to the recessed portions, and an insulator having a predetermined thickness may be provided to surround outer surfaces of the holder bodies except for the curved portions so that the holder bodies are thermally insulated from interior air of the heat radiating duct.

According to the cooling and heating cup holder having the above-described structure, when beverage is preserved in a cooled or heated state, heat loss can be minimized due to elimination of thermal resistance and a rapid effect can be improved by reducing necessary thermal capacity.

Further, the productivity of the cup holder can be remarkably improved and the cup holder can be manufactured in the form of a thin film, minimizing weight.

In addition, the cup holder shares one air conditioner in a sufficiently insulated state, achieving an optimum structure.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
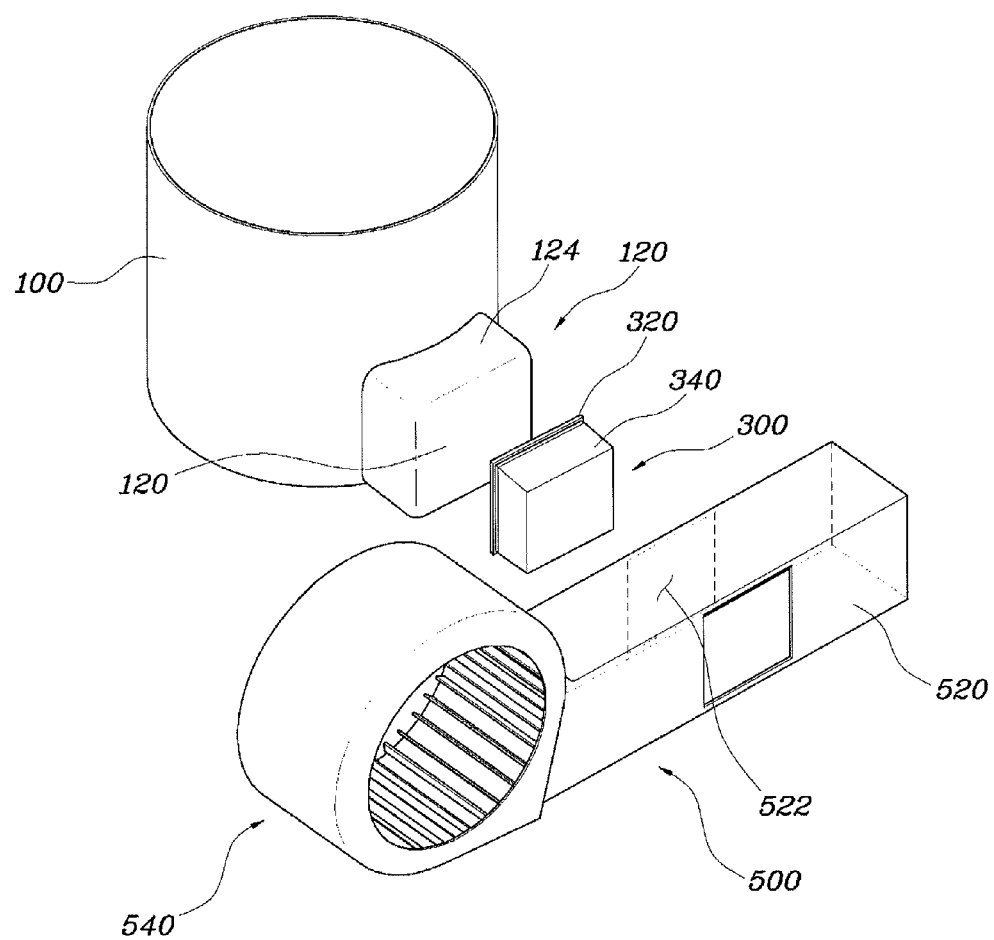
FIG. 1, FIG. 2, FIG. 3, FIG. 4 and FIG. 5 are views showing an exemplary cooling and heating cup holder according to the present invention.
Figure 2:
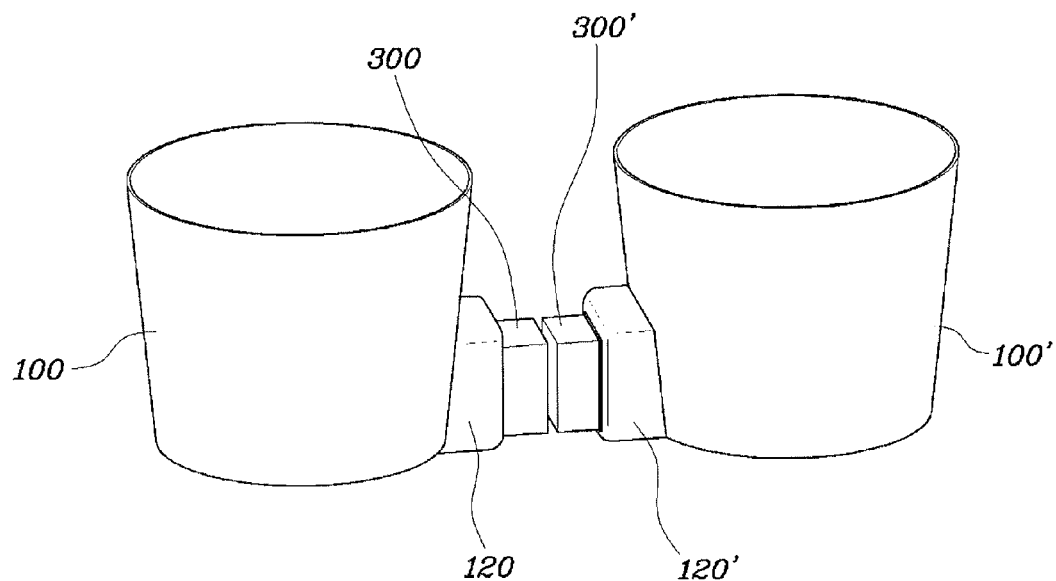
Figure 3:
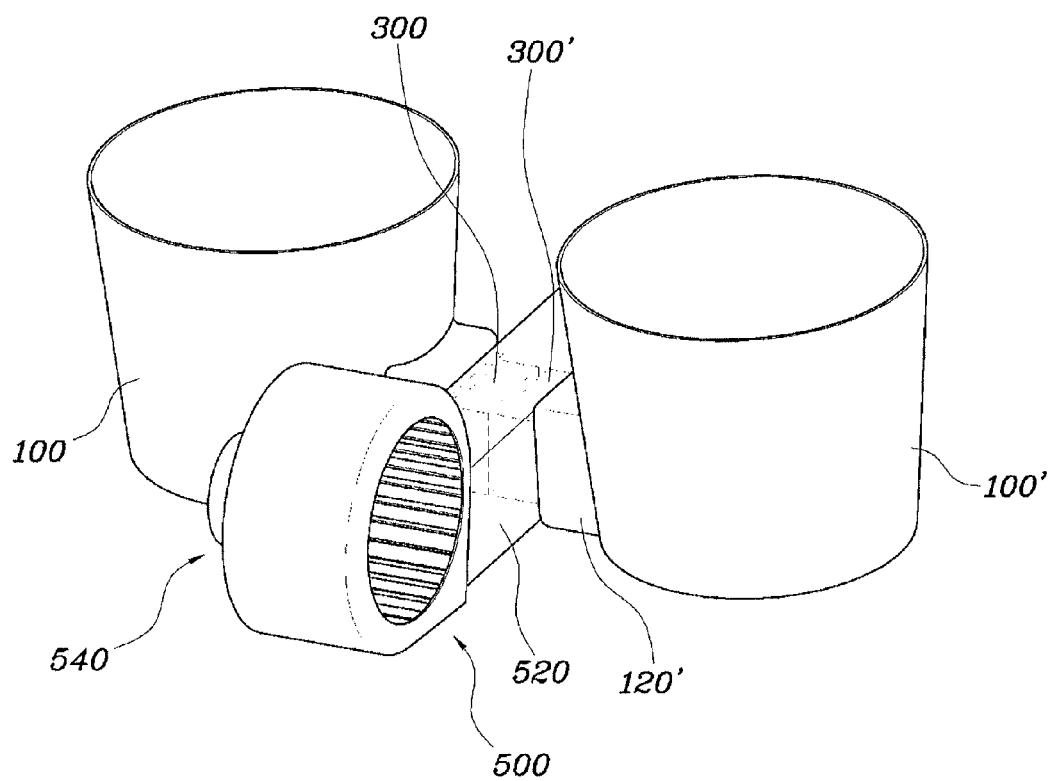
Figure 4:
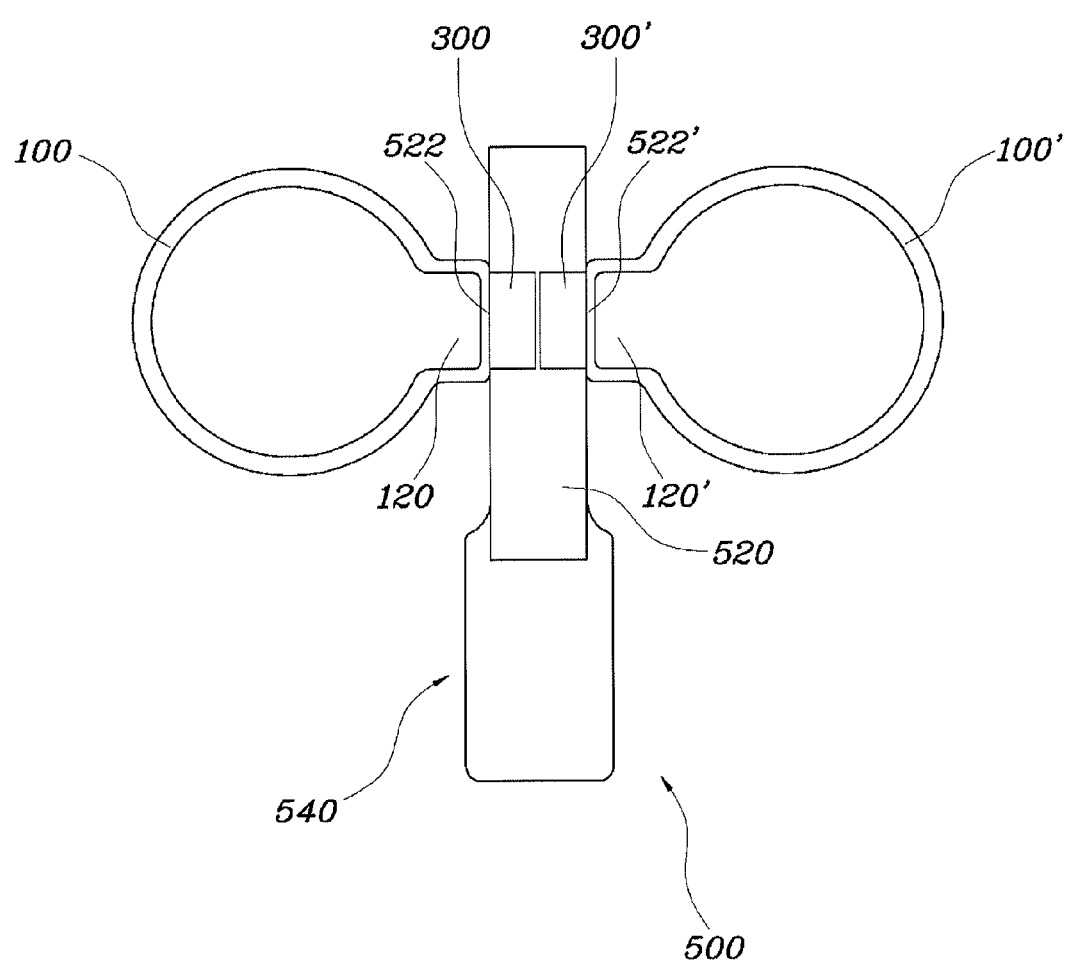
Figure 5:
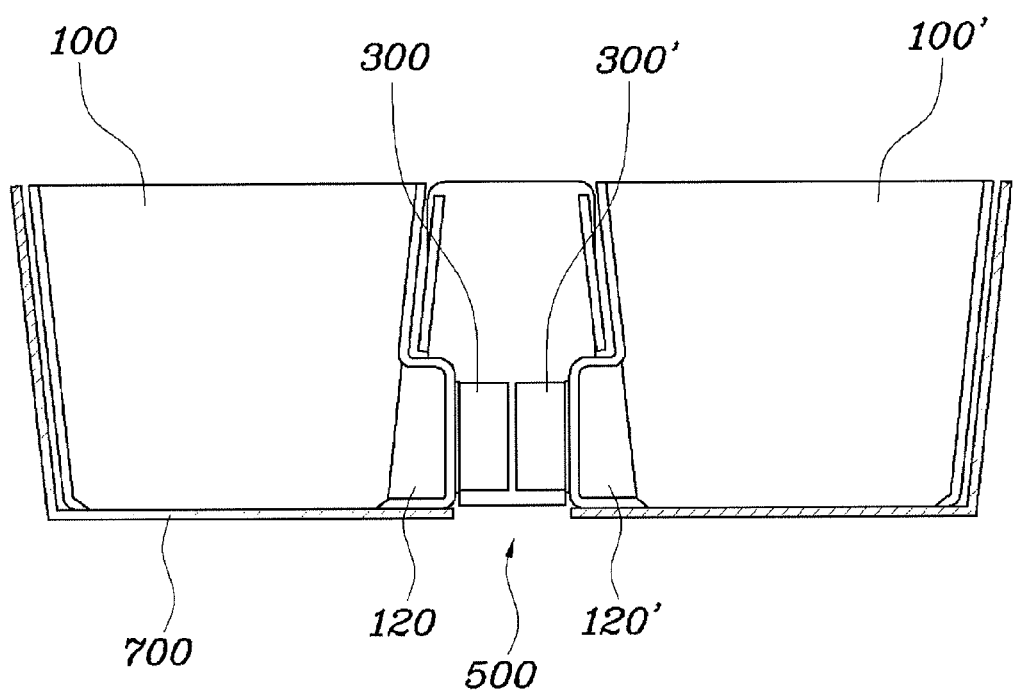

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIGS. 1 to 5 are views showing an exemplary cooling and heating cup holder according to the present invention. FIG. 1 shows one holder body, and FIGS. 2 to 5 show a cup holder having two holder bodies.

First, referring to FIG. 1, the cooling and heating cup holder according to various embodiments of present invention may include: a holder body 100 having a container shape, formed of a thermally conductive material, having a substantially uniform thickness, and having a contact portion 120 pressed from an inner side to integrally protrude outward from one side surface thereof and having a contact surface 122 forming a predetermined plane; a Peltier element 300 including an operation surface 320 and a heat radiating portion 340 having an opposite row opposite to the operation surface 320 and installed such that the operation surface 320 is directly attached to the contact surface 122 at an outer side of the holder body 100 to transfer heat to the contact surface 122; and an air conditioner 500 including a heat radiating duct 520 in which the heat radiating portion 340 of the Peltier element 300 is buried and a blowing fan 540 for blowing out air at one side of the heat radiating duct.

The holder body 100 corresponds to the body of the cup holder and having a container shape an upper surface of which is opened. Further, the holder body 100 is formed of a thermally conductive material to be cooled or heated through thermal conduction. The contact portion 120 is formed to have a substantially uniform thickness, and the contact portion 120 pressed from an inner side to protrude outward is integrally formed with one side surface of the holder body 100. One will appreciate that the contact portion may be monolithically formed with the holder body. The holder body 100 may be formed through a hydrofoaming method, and accordingly, the holder body 100 is uniformly formed to have a thin film together with the contact portion 120 to achieve a uniform thermal conduction effect.

The contact portion 120 has a contact surface 122 corresponding to a predetermined plane to directly make surface-contact with the Peltier element to be described below. The contact portion 120 has a side surface portion 124 bent at one side surface of the holder body 100 to protrude and a contact surface 122 formed on a plane to form an upper surface of the side surface portion 124. The operation surface 320 of the Peltier element 300 and the contact surface 122 of the holder body 100 make surface-contact with each other so that heat is directly transferred from the Peltier element 300 to the holder body 100.

In detail, the Peltier element 300 includes an operation surface 320 and a heat radiating portion 340 having a row opposite to the operation surface 320. According to the characteristics of the Peltier element 300, when electric power is applied, the operation surface 320 is cooled or heated, and the opposite surface is heated or cooled in contrast. Since it is important to radiate heat from the opposite surface to maximize the heat exchange characteristics of the Peltier element 300, the cooling/heating operation of the operation surface 320 is maximized by radiating heat with the heat radiating portion 340 on the opposite surface.

The operation surface 320 is directly attached to the contact surface 122 on an outer side of the holder body 100 such that heat is directly transferred from the operation surface 320 to the contact surface 122. Thus, since no heat transfer medium is inserted between the Peltier device 300 and the holder body 100, thermal efficiency is considerably improved and the number of manufacturing processes is minimized.

The heat radiating portion 340 of the Peltier element 300 corresponds to heat radiating fins attached to the heat radiating surface corresponding to an opposite surface to the operation surface 320, and the heat radiating duct 520 is installed to be close to the contact portion 120 of the holder body 100 such that the heat radiating portion 340 is entirely buried in the heat radiating duct 520.

The air conditioner includes a heat radiating duct and a blower, and the heat radiating portion 340 of the Peltier element 300 is buried in the heat radiating duct and a blowing fan 540 for blowing out air at one side of the heat radiating duct is provided to radiate heat. The heat radiating portion 340 of the Peltier element directly radiates heat as a burial hole 522 penetrates into the heat radiating duct 520 and is buried, achieving an effective air conditioning effect through a simple structure.

Due to the coupling relationship between the holder body, the Peltier element, and the air conditioner, direct thermal conduction can increase thermal efficiency, the integral shape of the holder body can reduce thermal resistance to achieve uniform cooling, and the compact heat radiating structure can reduce a volume of the product.

The cooling and heating cup holder further includes an insulator 700 provided to surround an outer surface of the holder body 100 by a predetermined thickness, and the insulator 700 surrounds the holder body 100 except for the contact portion 120. Through this, heat exchange around the contact portion 120 due to interior air of the heat radiating duct 520 can be prevented, making the thermal conduction at the contact portion 120 more effective.

Meanwhile, a pair of holder bodies 100 and a pair of Peltier elements 300 may be provided to face each other with respect to the heat radiating duct 520. The pair of Peltier elements 300 and 300' are installed to share the heat radiating duct 520 and the blowing fan 540. In this construction, since two cups can be received to have a symmetrical structure and can share the heat radiating structure, the entire volume becomes very compact.

The contract portions 120 and 120' of the holder bodies 100 and 100' protrude to face each other, the Peltier elements 300 and 300' are provided to the contact portions 120 and 120', respectively, and the heat radiating portions of the Peltier elements 300 and 300' are buried to face the heat radiating duct 520 such that heat is radiated by one blowing fan 540, making it possible to share the heat radiating structure.

In detail, a pair of holder bodies 100 and a pair of Peltier elements 300 are provided to face each other with respect to the heat radiating duct 520, and the contract portions 120 and 120' of the holder bodies 100 and 100' protrude to face each other, the Peltier elements 300 and 300' are provided to the contact portions 120 and 120', respectively.

When the heat radiating portions of the Peltier elements 300 and 300' are buried to face the heat radiating duct 520 such that heat is radiated by one blowing fan 540, the heat radiating portions of the Peltier 300 and 300' correspond to heat radiating fins attached to a heat radiating surface corresponding to an opposite surface of the operation surface, and the heat radiating duct 520 is installed close to the contact portions 120 and 120' of the holder bodies 100 and 100' such that the heat radiating portions are entirely buried in the heat radiating duct 520, two holder bodies can be cooled and heated at the same time through one heat radiating structure and the heat radiating portions of the Peltier elements 300 and 300' are buried to face each other in the heat radiating duct 520 so that the holder bodies 100 are located close to each other and have a compact structure.

Figure 6:
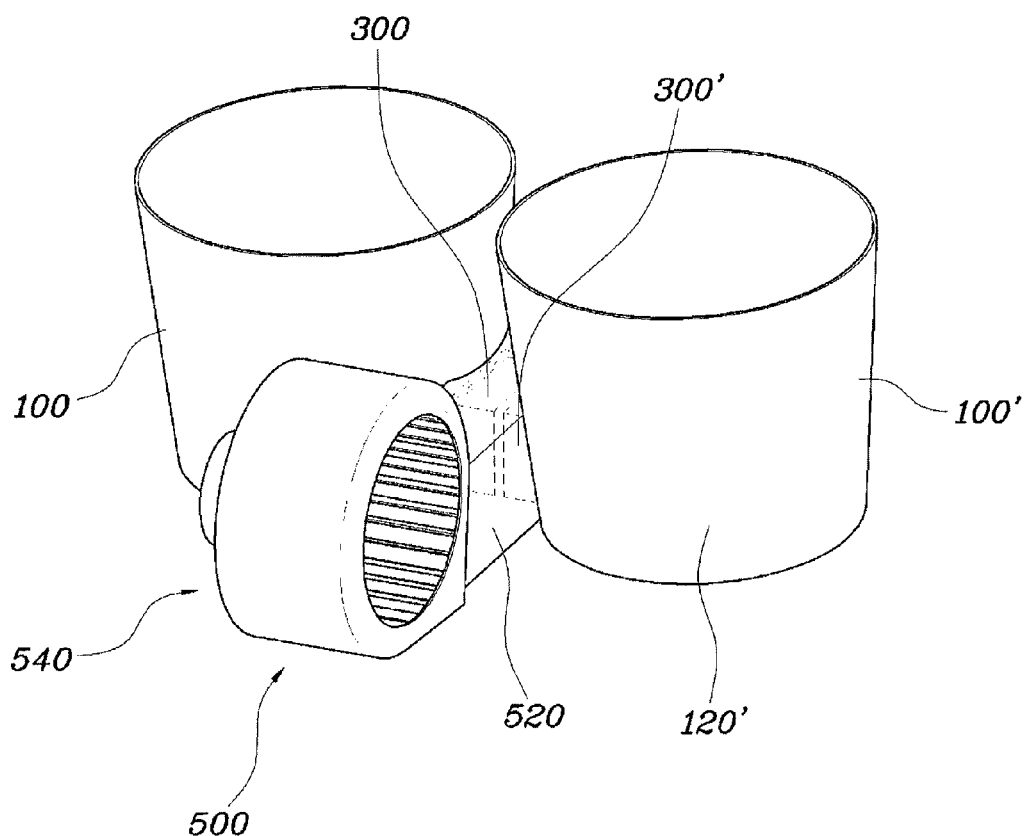
FIG. 6, FIG. 7 and FIG. 8 are views showing an exemplary cooling and heating cup holder according to the present invention.
Figure 7:
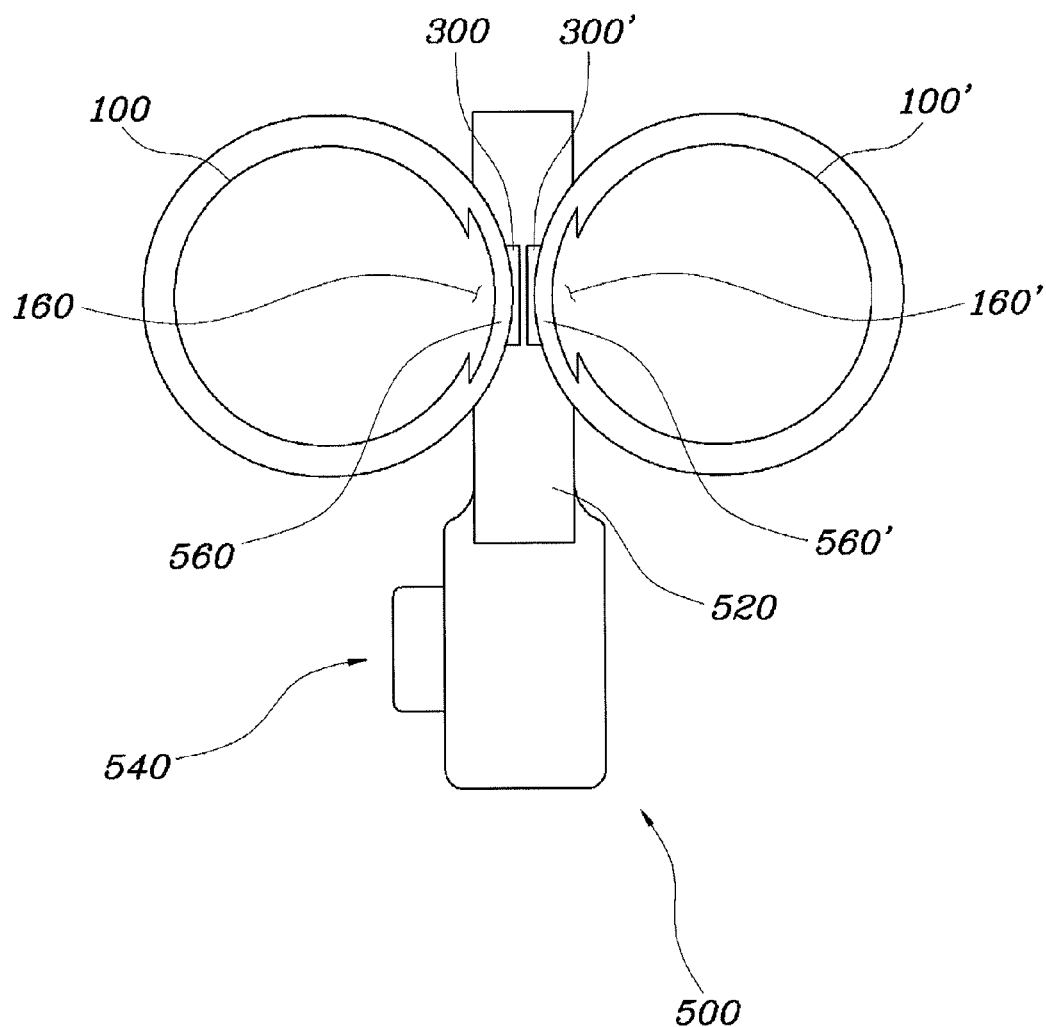
Figure 8:
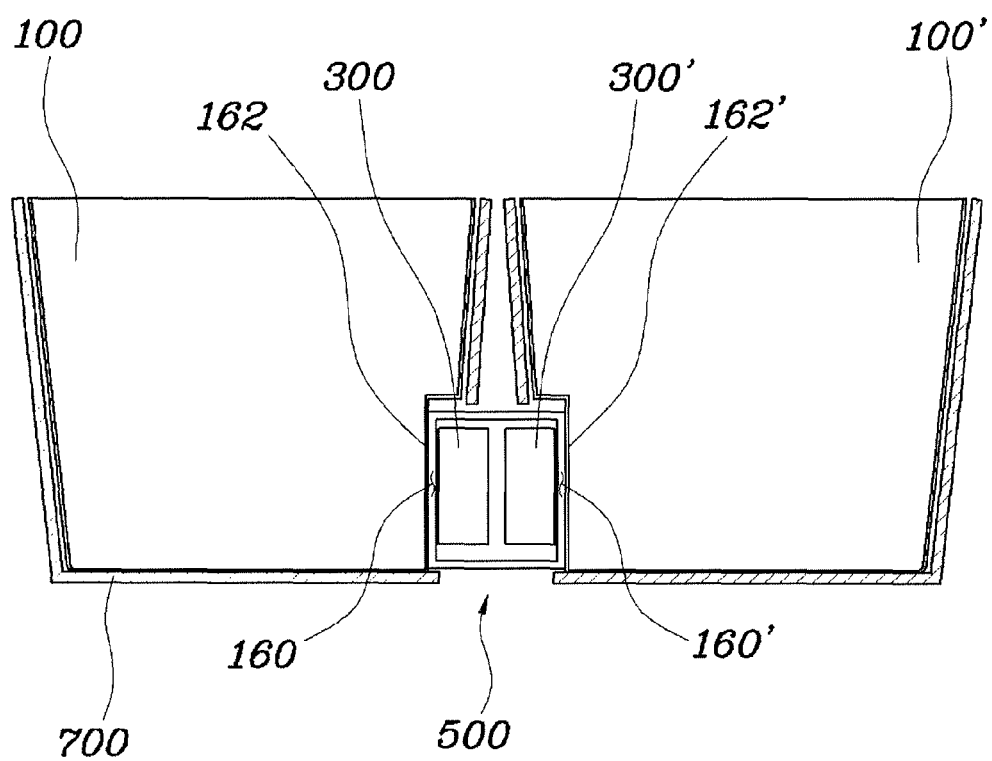

FIGS. 6 to 8 are views showing an exemplary cooling and heating cup holder according to the present invention, and the cooling and heating cup holder according to various embodiments of the present invention are characterized in that a coupling portion of a Peltier element formed in a holder body has a curved portion 160 bent inward.

The holder body 100 has a container shape, is formed of a thermally conductive material, has a substantially uniform thickness, and has a curved portion 160 pressed from an outer side to be integrally curved inward from one side surface thereof and having an attaching surface 162 forming a predetermined plane.

Like the above embodiments, the Peltier element 300 includes an operation surface 320 and a heat radiating portion 340 having an opposite row opposite to the operation surface 320 and installed such that the operation surface 320 is directly attached to the attaching surface 162 at an outer side of the holder body 100 to transfer heat to the contact surface 122.

Meanwhile, the cooling and heating cup holder includes an air conditioner 500 including a heat radiating duct 520 in which the heat radiating portion 340 of the Peltier element 300 is buried and a blowing fan 540 for blowing out air at one side of the heat radiating duct.

Even in this structure, a pair of holder bodies 100 and a pair of Peltier elements 300 may be provided to face each other with respect to the heat radiating duct 520, and the heat radiating duct 520 may be installed to pass between the facing curved portions 160 and 160' such that both the facing heat radiating portions are buried to face the heat radiating duct 520 so as to share the heat radiating duct 520 and the blowing fan 540.

However, streamlined recessed portions 560 and 560' need to formed at opposite points of opposite side surfaces of the heat radiating duct 520. A pair of holder bodies 100 and 100' are seated on the recessed portions 560 and 560' to be attached to the recessed portions 560 and 560'. Through this structure, the distance between the holder bodies 100 and 100' can be made closer than in the above embodiments.

Meanwhile, an insulator 700 having a predetermined thickness is provided to surround outer surfaces of the holder bodies 100 and 100' except for the curved portions 160 and 160' so that the holder bodies 100 and 100' are thermally insulated from interior air of the heat radiating duct 520. Thus, the holder bodies 100 and 100' attached and coupled to an interior of the heat radiating duct 520 are thermally insulated so as not to damage cooling and heating efficiency.

According to the cooling and heating cup holder having the above-described structure, when beverage is preserved in a cooled or heated state, heat loss can be minimized due to elimination of thermal resistance and a rapid effect can be improved by reducing necessary thermal capacity.

Further, the productivity of the cup holder can be remarkably improved and the cup holder can be manufactured in the form of a thin film, minimizing weight.

In addition, the cup holder shares one air conditioner in a sufficiently insulated state, achieving an optimum structure.

For convenience in explanation and accurate definition in the appended claims, the terms upper and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling and heating cup holder comprising:
   a holder body shaped to receive a container therein, formed of a thermally conductive material, having a substantially uniform thickness, and having a curved portion integrally recessed from one side surface of the holder body wherein the curved portion has an attaching surface forming a predetermined plane;
   a Peltier element including an operation surface and a heat radiating portion having an opposite row opposite to the operation surface and installed such that the operation surface is directly attached to the attaching surface at an outer side of the holder body to transfer heat to a contact surface; and
   an air conditioner including a heat radiating duct in which the heat radiating portion of the Peltier element is inserted and a blowing fan for blowing out air at one side of the heat radiating duct,
   wherein a pair of holder bodies and a pair of Peltier elements are provided to face each other with respect to the heat radiating duct, and the heat radiating duct is installed to pass between the facing curved portions such that both the facing heat radiating portions are buried to face the heat radiating duct so as to share the heat radiating duct and the blowing fan.

2. The cooling and heating cup holder of claim 1, wherein streamlined recessed portions are formed at opposite points of opposite side surfaces of the heat radiating duct, a pair of holder bodies are seated on the recessed portions to be attached to the recessed portions, and an insulator having a predetermined thickness is provided to surround outer surfaces of the holder bodies except for the curved portions so that the holder bodies are thermally insulated from interior air of the heat radiating duct.

* * * * *